United States Patent [19]
Miller

[11] Patent Number: 4,680,845
[45] Date of Patent: Jul. 21, 1987

[54] METHOD OF MANUFACTURING LATERAL HEADER EXTENSIONS

[75] Inventor: Donald E. Miller, Adrian, Mich.

[73] Assignee: Brazeway, Inc., Adrian, Mich.

[21] Appl. No.: 824,667

[22] Filed: Jan. 31, 1986

[51] Int. Cl.$^4$ .............................................. B21D 53/00
[52] U.S. Cl. .......................... 29/157 R; 29/157.3 R; 29/157.4; 72/359; 72/391; 165/173
[58] Field of Search ............ 29/157 R, 157.3 R, 157.4, 29/DIG. 26, DIG. 47; 72/359, 391; 165/173

[56] References Cited

U.S. PATENT DOCUMENTS 4,152,818  5/1979  Mort et al. ................. 29/157.4 X
4,290,413  9/1981  Goodman et al. ............ 165/173 X

FOREIGN PATENT DOCUMENTS 197799  5/1958  Austria ..................... 165/173
2234539  1/1975  France ..................... 165/173

Primary Examiner—Howard N. Goldberg
Assistant Examiner—Ronald S. Wallace
Attorney, Agent, or Firm—Krass & Young

[57] ABSTRACT

An aluminum header tube having a plurality of integral and regularly spaced lateral extensions is formed according to a method which includes the steps of forming stubs for the extensions, inserting a tool through each stub and into the interior of the header tube, sizing each stub to reduce its inside and outside diameter and, while maintaining the clamp, withdrawing the tool through the stub to cause metal to flow outwardly, thus raising or lengthening the stub to the desired degree.

6 Claims, 7 Drawing Figures

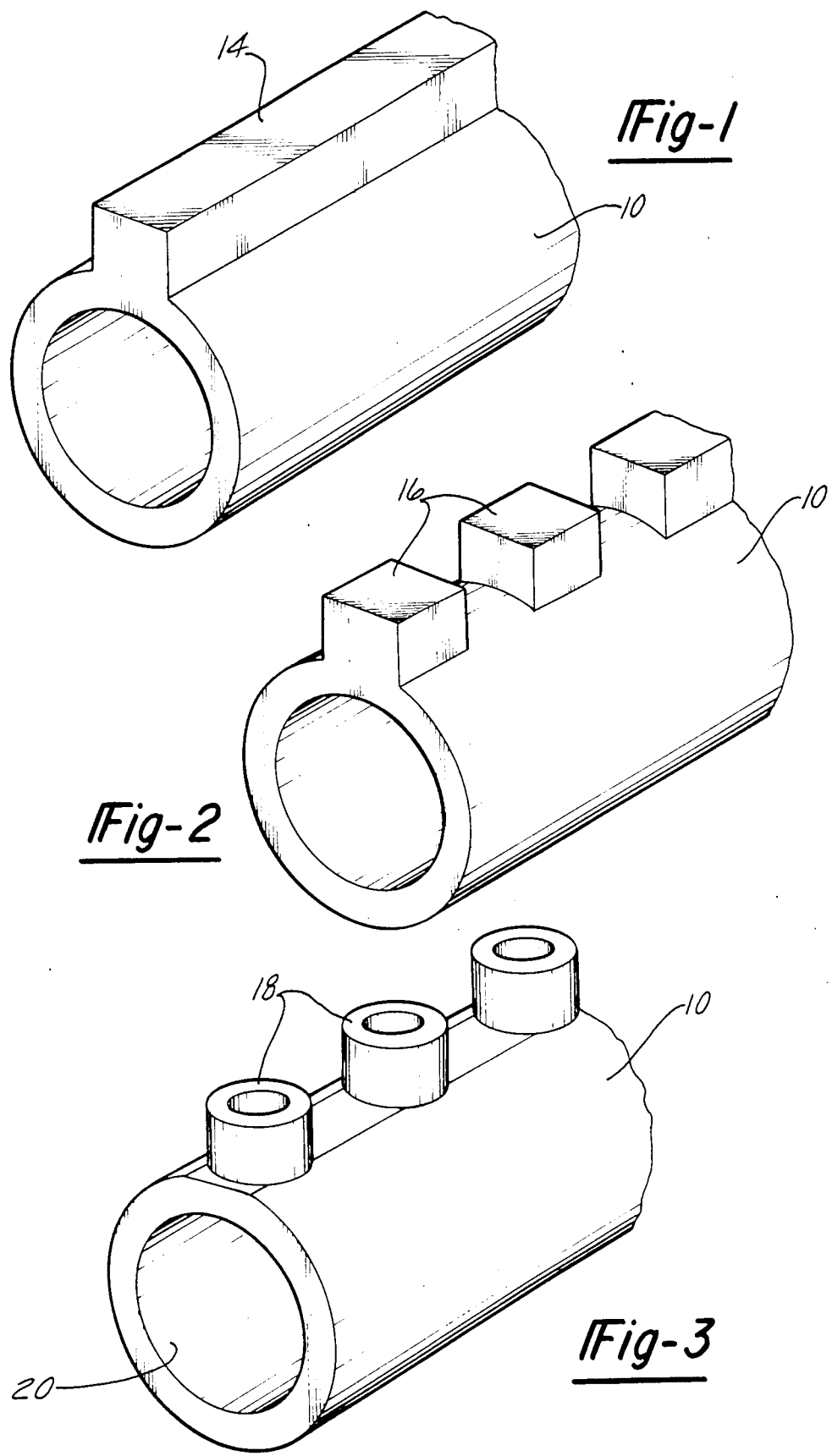

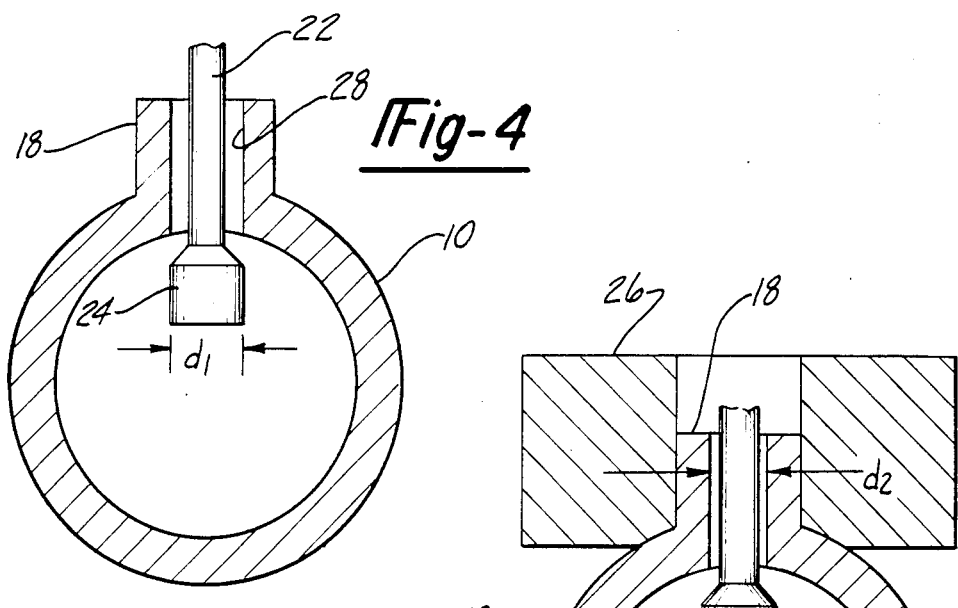
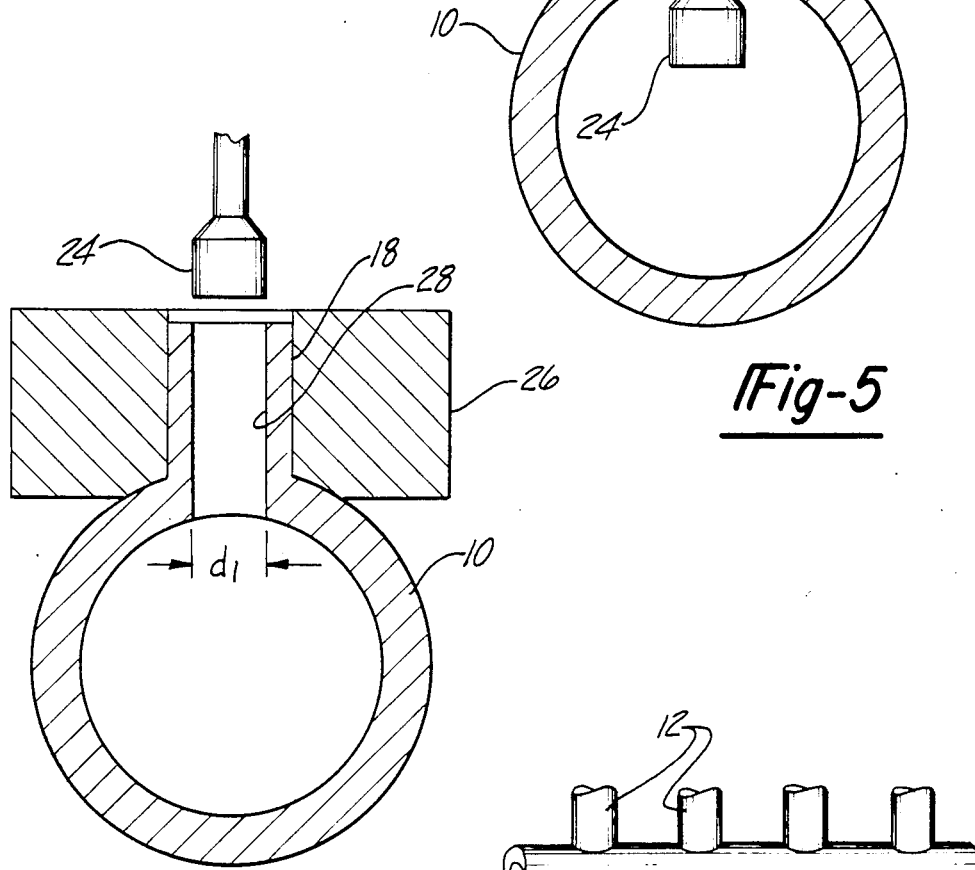
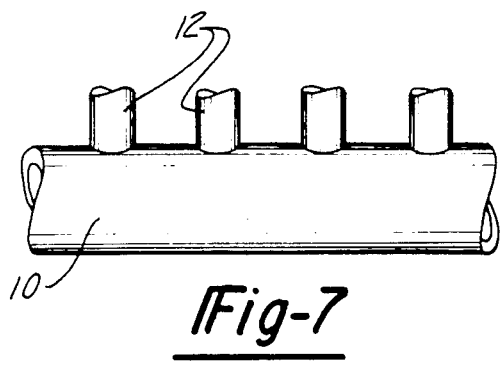

1

METHOD OF MANUFACTURING LATERAL HEADER EXTENSIONS

INTRODUCTION

This invention relates to fabricated metal products and more particularly to a method for producing a metal header tube having one or more smaller diameter lateral extensions which are integral with the header tube and of substantial length.

BACKGROUND OF THE INVENTION

Fluid systems found in heaters, air conditioners, coolers, dehumidifiers, freezers and the like utilize a number of complex components which serve as fluid conduit. For example, a trunk or header tube may be required to interconnect with a number of lateral tubes of smaller diameter such as the hairpin-bent tubes of a fin-tube evaporator or condenser. A number of techniques can be used for joining the hairpin tubes to the header tube but the most desirable connection method involves the formation of a stub tube or lateral extension at each of several spaced intervals along the header tube. The problem with the prior art is to form an extension or stub tube of substantial length so as to facilitate the production of a secure connection to the hairpin tubes.

SUMMARY OF THE INVENTION

The principal objective of the present invention is to develop by metal deformation process steps an integral lateral extension or series of such extensions on a metal header tube, which extensions are raised to a substantial length in an efficient and economical way.

In general the method of the invention comprises the steps of extruding a tube having a solid lateral appendage, forming short stub collars out of the appendage, inserting a metal deforming tool such as a punch of working diameter $d_1$ through the stubs and into the header tube, mechanically deforming the stub such as by radial sizing reduced inner diameter $d_2$ which is smaller than $d_1$ and, while holding the outer diameter of the stub to prevent an expansion thereof, withdrawing the tool through the stub to restore the inner diameter to $d_1$ by reducing the wall thickness of the stub and, at the same time, raising or increasing the length of the stub.

These steps may be repeated until the stub is raised to the desired length and forms a substantial lateral extension.

The method is preferably carried out on and in connection with an extruded metal product such as an aluminum header tube which is extruded integrally with a continuous lateral extension or arm. Preliminary process steps which are generally described above may include the removal of sections of the integral arm at spaced intervals and rounding and drilling of the remaining arm stock to form the stub as relatively short collar like extensions.

BRIEF DESCRIPTION OF THE DRAWING

FIG. 1 is a perspective view of a suitable extruded tube with integral lateral arm;

FIG. 2 is a perspective view of the same length of header tube but with sections of arm stock removed;

FIG. 3 is a perspective view of the same section of header tube but with the lateral extension stock rounded off and drilled through;

FIG. 4 is a cross-sectional view of a header tube prepared according to the process steps of FIGS. 1-3 and with a forming punch inserted through the lateral extension;

FIG. 5 is a section of header tube with the stub collar sized to a reduced inner and outer diameter condition;

FIG. 6 is an illustration of the header tube after the metal working tool has been withdrawn to enlarge the diameter of the stub, reduce the thickness thereof and lengthen it; and FIG. 7 is an illustration of the end product.

DETAILED DESCRIPTION OF THE SPECIFIC EMBODIMENT

The overall objective of the process hereinafter described is to produce a header tube 10 as shown in FIG. 7 which has a plurality of smaller diameter lateral extension tubes 12 formed integrally therewith. More specifically the process is useful in producing extension tubes 12 of substantial length so as to facilitate the connection of the header tube 10 to a plurality of lateral or tributary tubes such as hairpin-bent tubes used in fin-tube type heat exchangers. Although not specifically illustrated in FIG. 7 it will be understood by those skilled in the art that the trunk or header tube 10 may be blocked at spaced intervals to produce the desired pattern of fluid flow into and out of the lateral tubes.

Looking now to FIGS. 1-6 the method of the invention will be described in progressive style. The extrusion and maching steps of FIGS. 1-3 are preliminary to the final steps of raising or lengthening the initially formed stub collar of the lateral extension 12 by metal deformation as shown in FIGS. 4-6.

FIG. 1 illustrates in perspective a representative length of extruded aluminum header tube 10 having an integral rectangular arm 14 projecting from one side; again, this is merely illustrative as the arm 14 may project from the tube 10 at any point and, similarly, it is possible to extrude the tube 10 with several such arms at spaced locations if multiple lines of extension tubes 12 or a staggered arrangement of same is desired. The extrusion process step is carried out in a state-of-the-art press using an extrusion die of the proper cross-section.

FIG. 2 illustrates the second preliminary step wherein the arm 14 is milled out at spaced intervals to produce a series of extension blanks 16 which are generally cubic in configuration.

FIG. 3 illustrates the further steps of rounding off the blanks 16 to produce stubs 18 which are then drilled through to the interior diameter 20 of the header tube 10. The drilling and rounding steps may be performed in reverse order.

Now that the stubs 18 have been fully formed, the steps of raising or lengthening the stubs 18 are performed according to the sequence shown in FIGS. 4-6. As shown in FIG. 4 the first step is to insert a metal working tool such as punch 22 the operating head 24 of which has a working diameter $d_1$ through the drilled hole 28 in the stub collar 18. The hole 28 is preferably very close to $d_1$, nominally larger than $d_1$, to permit easy entry of the tool head 24. Note that while the working diameter of the tool head 24 is $d_1$, the shaft by which it is inserted is substantially less than $d_1$.

This facilitates the performance of the step illustrated in FIG. 5 wherein a size-reducing die 26 is forced down around the collar 18 to deform the collar inwardly so that both the inner and outer diameters thereof are reduced. The inner diameter is reduced to a diameter $d_2$ which is substantially less than the diameter $d_1$ and which is empirically determined according to considerations of metal mass and flow hereinafter described.

With the sizing die 26 in place, the punch 22 is withdrawn through the opening 28. The effect is shown in FIG. 6; the interior diameter of the stub 18 is restored to $d_1$, the working diameter of the tool head 24, and the wall thickness of the stub collar 18 is reduced causing metal to flow radially outwardly in front of the tool head 24 as it is withdrawn. This has the effect of raising or lengthening the stub collar 18 in the lateral direction while controlling both inner and outer diameters to precise values.

The steps illustrated in FIGS. 4, 5 and 6 may be repeated as necessary until the stub collar 18 reaches the desired length.

Details such as lubrication, temperatures and choice of materials will all be apparent to those skilled in the metal working art. As stated above the preferred material from which to construct the product as shown in FIG. 7 is aluminum or alloys of aluminum but other readily deformable metals such as copper may also be employed. In fact the invention is also usable in connection with harder less ductile metals, the method in this case being carried out at an elevated temperature.

What is claimed is:

1. A method of raising a hollow lateral extension on a header tube comprising the steps of:
   (a) inserting a tool of working diameter $d_1$ through the extension and into the header tube;
   (b) mechanically deforming the extension to a reduced inner diameter $d_2$, which is less than $d_1$; and
   (c) while maintaining the outer diameter of the extension withdrawing the tool through the extension to restore the inner diameter to $d_1$ by lengthening and reducing the wall thickness of the extension.

2. The method of claim 1 wherein the extension is initially formed by integral extrusion with the header tube.

3. The method of claim 2 wherein the extended extension is drilled to the diameter $d_1$ prior to inserting the tool.

4. The method of claim 1 wherein the steps of insertion, deformation and withdrawal are repeated to progressively raise the extension to greater lengths.

5. A method of manufacturing a header tube having a plurality of lateral extensions formed thereon and communicating with the header tube comprising the steps of:
   extruding the header tube integral with a continuous lateral arm;
   removing material from the arm at spaced intervals to form blank stubs;
   rounding off the stubs;
   drilling the stubs through to the header tube interior;
   inserting a tool of working diameter $d_1$ through at least one of the stubs;
   mechanically deforming the stub to an inner diameter $d_2$ which is smaller than $d_1$; and
   while maintaining the outer diameter of the extension, withdrawing the tool through the extension to restore the inner diameter to $d_1$ by lengthening and reducing the wall thickness of the extension.

6. The method defined in claim 5 wherein the header is aluminum.

* * * * *